Figure 1:
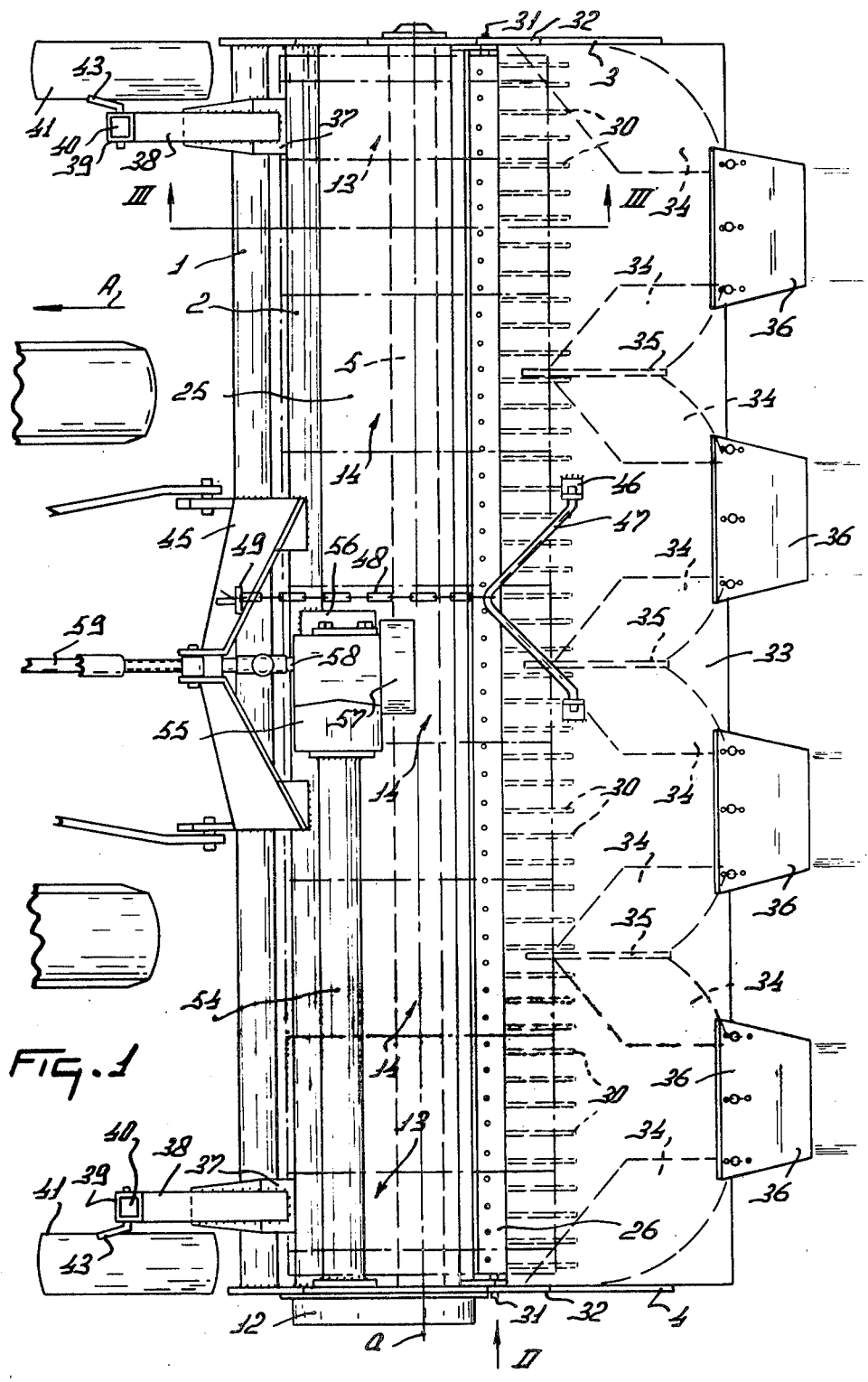

United States Patent [19]

van der Lely et al.

[11] 4,151,883
[45] May 1, 1979

[54] SOIL CULTIVATING MACHINES

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 801,749

[22] Filed: May 31, 1977

[30] Foreign Application Priority Data

Feb. 8, 1977 [NL] Netherlands ................ 7702108

[51] Int. Cl.$^2$ .................... A01B 33/02; A01B 33/16
[52] U.S. Cl. .................................. 172/32; 172/45;
172/51; 172/60; 172/63; 172/70; 172/72;
172/112; 172/123
[58] Field of Search ................ 172/27, 32, 45, 50,
172/51, 52, 57, 60, 63, 70, 71, 72, 112, 118, 123,
548, 549, 550, 556, 701, 713, 719, 747;
308/DIG. 10

[56] References Cited

U.S. PATENT DOCUMENTS

| | | | |
|---|---|---|---|
| 1,447,883 | 3/1923 | Peterson | 172/747 |
| 2,150,839 | 3/1939 | Miller et al. | 172/549 |
| 2,351,361 | 6/1944 | Ockrant et al. | 308/DIG. 10 |
| 2,477,662 | 8/1949 | Seaman | 172/556 X |
| 2,754,744 | 7/1956 | Hall | 172/548 |
| 2,795,176 | 6/1957 | O'Hara | 172/32 |
| 3,347,188 | 10/1967 | Richey | 172/548 X |
| 3,532,169 | 10/1970 | Lely et al. | 172/32 |
| 3,557,880 | 1/1971 | Lely et al. | 172/112 X |
| 3,765,491 | 10/1973 | Lely et al. | 172/45 X |
| 3,791,322 | 2/1974 | Lely et al. | 172/112 X |
| 3,882,594 | 5/1975 | Jackson et al. | 172/747 X |
| 3,970,012 | 7/1976 | Jones | 172/112 X |

FOREIGN PATENT DOCUMENTS

| | | | |
|---|---|---|---|
| 2145899 | 3/1972 | Fed. Rep. of Germany | 172/123 |
| 45053 | 9/1961 | Poland | 172/45 |
| 275006 | 8/1927 | United Kingdom | 172/549 |

*Primary Examiner*—Paul E. Shapiro
*Attorney, Agent, or Firm*—William B. Mason; Penrose Lucas Albright

[57] ABSTRACT

A cultivating machine has tines mounted on an elongated horizontal support that is driven to move the tines forwardly through the soil towards the normal direction of travel. The tines are in groups along the length of the support and each group has a number of pairs of opposing units. Each unit includes bracket portions having two rims and a tine is fastened to each rim. Opposing portions are bolted together to form a whole bracket that mounts four tines around the support. Each tine is a strip-shaped member that is hook-like in configuration with an inner straight portion and an outer soil working portion having a pointed tip. The inner portion has a series of holes along its length which can be releasably fastened to a respective rim in any one of a plurality of positions that change the working length of the tine. A front hood partially surrounds the tines and support and a rod grating is positioned at the rear of the tines. A rear hood is connected to the machine and located behind the grating. Spaced apart guide members in pairs are mounted on the underside of the rear hood and positioned to receive soil displaced by the tines and form ridges. Flexible flaps are located in the spaces between the guide members to smooth the ridges. Strikers can be mounted between the tine groups to lap the growth of crop on the ridges.

14 Claims, 8 Drawing Figures

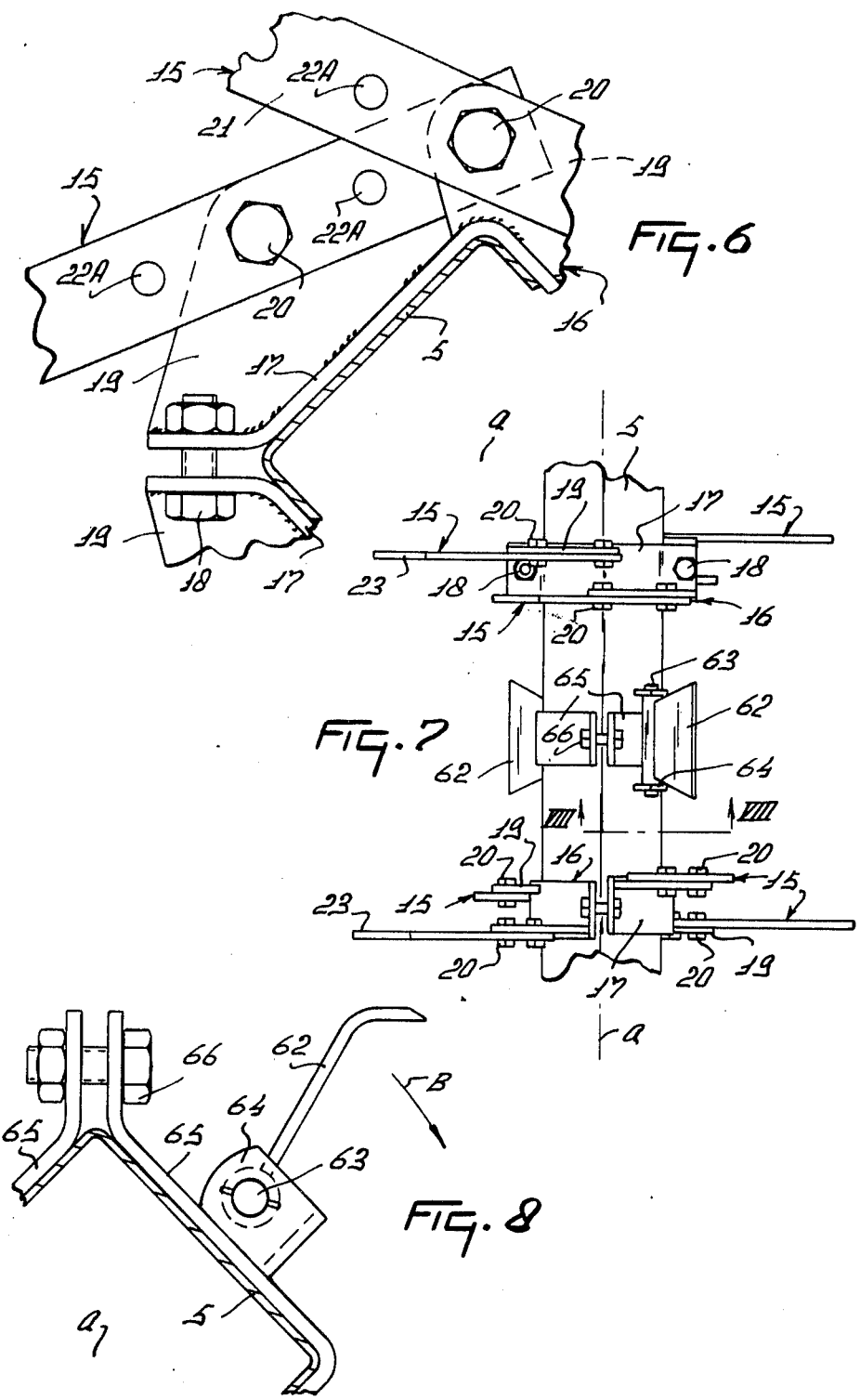

SOIL CULTIVATING MACHINES

Figure 2:
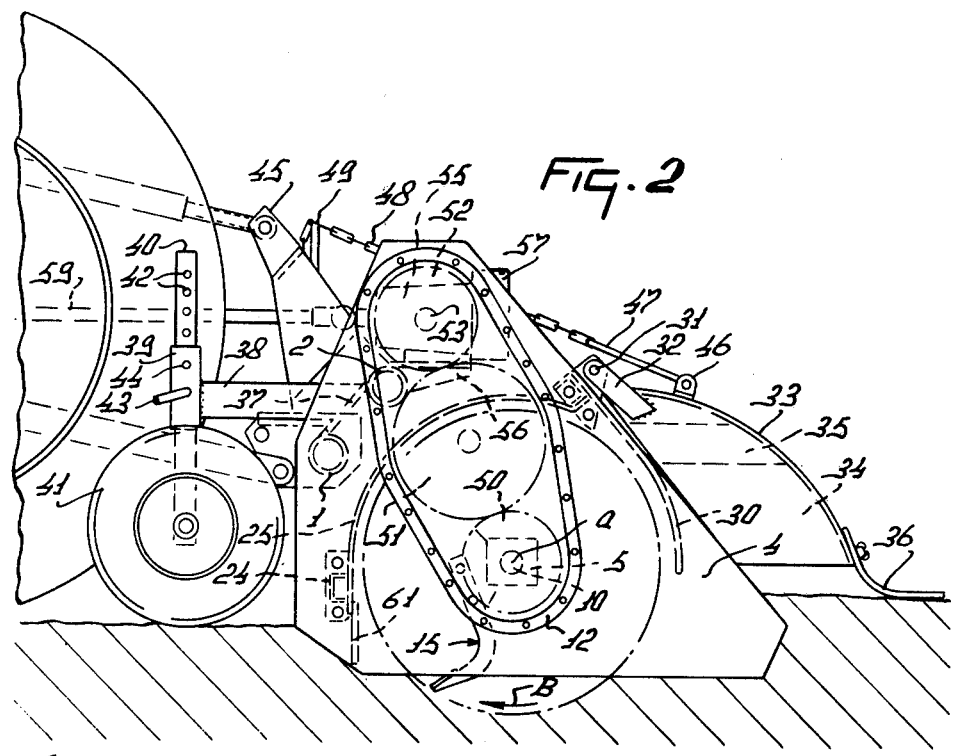
Figure 3:
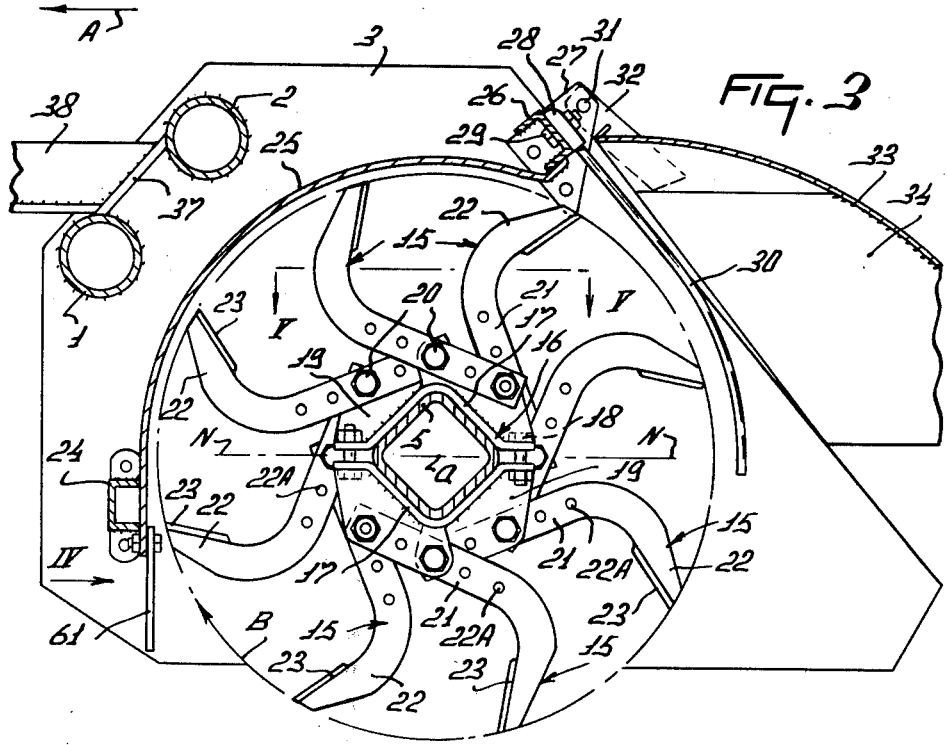
Figure 4:
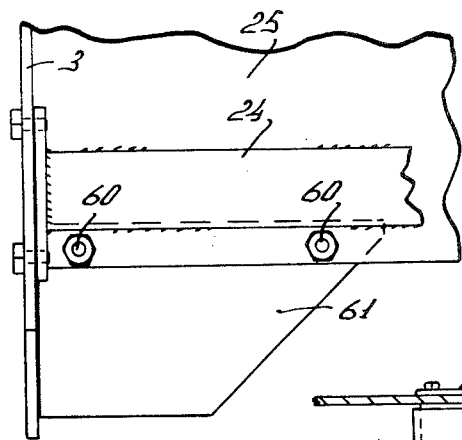
Figure 5:
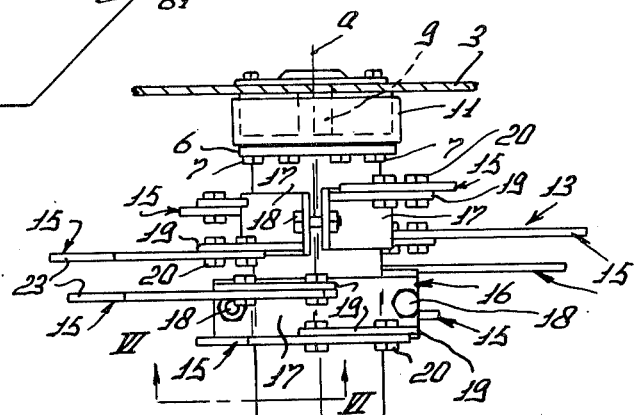
Figure 5:
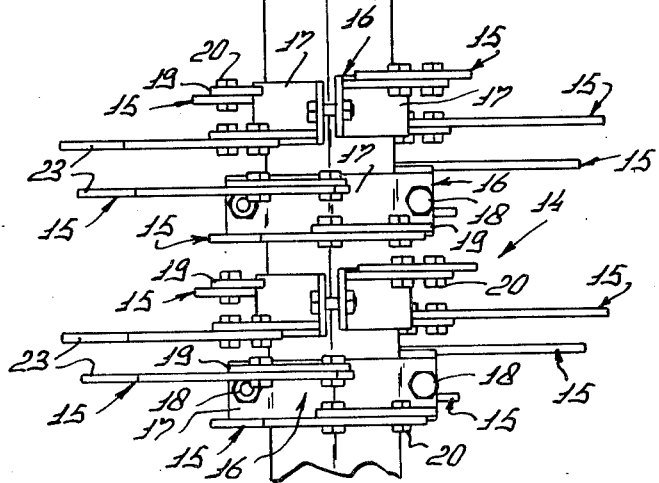

For a better understanding of the invention, and to show how the same may be carried into effect, reference will now be made, by way of example, to the accompanying drawings, in which:

FIG. 1 is a plan view of a machine in accordance with the invention connected to the rear of an agricultural tractor, FIG. 2 is a side elevation of the machine of FIG. 1 as seen in the direction indicated by an arrow II in FIG. 1, FIG. 3 is a section, to an enlarged scale, taken on the line III—III in FIG. 1, FIG. 4 is a front view, to an enlarged scale, as seen in the direction indicated by an arrow IV in FIG. 3, FIG. 5 is a section taken on the line V—V in FIG. 3, FIG. 6 is a section, to an enlarged scale, taken on the line VI—VI in FIG. 5, FIG. 7 is a similar view to FIG. 5 but illustrates the mounting of strikers for co-operation with the haulms of potato and like plants, and FIG. 8 is a section, to an enlarged scale, taken on the line VIII—VIII in FIG. 7, Referring to the accompanying drawings, the soil cultivating machine that is illustrated therein has a frame that comprises two beams 1 and 2 that both extend substantially horizontally transverse, and usually substantially horizontally perpendicular, to the intended direction of operative travel of the machine that is indicated in the drawings by an arrow A, both of said beams 1 and 2 being of hollow formation and circular cross-section with the beam 1 located at a lower horizontal level than the beam 2 and in advance of that beam with respect to the direction A. The opposite ends of the beams 1 and 2 are fastened to upwardly extending side plates 3 and 4 that are both preferably substantially vertically parallel to one another and substantially parallel to the direction A although it is not essential that the plates 3 and 4 should be strictly vertically disposed and they may be arranged in merely upwardly extending positions. The slightly different shapes of the two plates 3 and 4 can be seen in FIGS. 3 and 2 of the drawings, respectively. A hollow support 5 extends substantially horizontally perpendicular to the direction A and is rotatably connected to the two side plates 3 and 4 in perpendicular relationship with those side plates when, as preferred, the latter are in substantially vertically parallel relationship with one another. The support 5 lies substantially midway between the leading and rearmost extremities of the plates 3 and 4, considered in the direction A, and is between the uppermost and lowermost edges of both of them, said support being a little nearer to the lower edges than it is to the upper edges. The opposite ends of the support carry perpendicular flanges 6 (FIG. 5) and said flanges are releasably secured by bolts 7 to abutting flanges which carry respective stub shafts 9 (FIG. 5) and 10 (FIG. 2). The stub shafts 9 and 10 effectively extend beyond the opposite ends of the support 5 when their respective flanges are secured to the flanges 6 by the bolts 7. The stub shaft 9 which is the immediate neighbour of the side plate 3 is surrounded by a rotary bearing contained within a bearing housing 11 that is releasably secured to the plate 3. The stub shaft 10 (FIG. 2) at the opposite end of the support 5 is similarly rotatably journalled in a bearing carried by a bearing housing that is secured to the side plate 4 but, in this case, said stub shaft 10 extends through and beyond the side plate 4 into a lower region of a gear box 12 which is fastened to the outer surface of the side plate 4. The gear box 12 contains parts of a drive transmission to the rotary support 5, the construction and operation of said drive transmission being further described below.

The rotary support 5 is provided at substantially equal intervals along its axial length with five groups of tines 13 and 14, there being two tine groups 13 that are located near to the opposite ends of the support 5 and three further tine groups 14 that are located on the support between the two end groups 13. Each of the tine groups 13 and 14 comprises a number of tine units that are mounted on the support 5 with each such unit consisting of two diametrically opposed pairs of hook-shaped tines 15. The outermost or end tine groups 13 each comprise only two of the tine units whereas each of the three intermediate tine groups 14 has four of the tine units. The tine units in each group are spaced apart from one another by substantially regular distances which preferably have magnitudes of not less than substantially 3 centimeters and not more than substantially 6 centimeters. The two opposed pairs of tines 15 of each unit are fastened to opposed indentical portions 17 of a corresponding bipartite bracket 16. It can be seen from several Figures of the drawings that the rotary support 5 is of hollow formation and square or substantially square cross-section and that, apart from fastening lugs at the ends of their limbs, the bracket portions 17 are of L-shaped cross-section, being dimensioned to fit against two neighbouring perpendicularly inclined outer surfaces of the support 5. Thus, by the use of small bolts 18 co-operating with 17. The two portions 17 of each bracket 16 can be clamped firmly in their appointed positions around the support 5 in a manner which is, however, a readily releasable one. The fastening lugs at the free ends of the limbs of the bracket portions 17 are disposed in substantially, although not exactly, radial relationship with the combined longitudinal axis and axis of rotation a of the rotary support 5 when said brackets 16 are clamped in their appointed positions lengthwise along the support 5. It will be noted from FIG. 5 of the drawings that the holes which are formed in the fastening lugs for the reception of the bolts 18 are so disposed that, when the two portions 17 of each bracket are interconnected by the bolts 18, those two portions are slightly staggered relative to one another lengthwise of the axis a.

When the two portions 17 of each bracket 16 are clamped together by the bolts 18, the edges thereof that are furthest remote, considered lengthwise of the axis a, have fastening rims 19 that are all in perpendicular or substantially perpendicular relationship with the axis a. Each rim 19 is formed with two spaced holes for the reception of bolts 20 that fasten the tines 15 to the rims 19. FIG. 5 of the drawings shows the arrangement of the tines 15 relative to the rims 19 and it will be seen from that Figure that, for each bracket portion 17, the two tines 15 that are connected thereto by the two corresponding rims 19 are both secured by the bolts 20 to the same sides of those rims 19 so that, with the symmetrical construction and arrangement of each bracket 16, the two tines 15 that correspond to one portion 17 thereof are effectively at the opposite sides of the respective rims 19 to the two tines 15 that are connected by the corresponding rims 19 to the other portion 17 of the same bracket 16. The result of this arrangement is that the four tines 15 of each tine unit rotate, during the use of the implement, around the axis a in four corresponding planes which are spaced apart from one another by short but substantially regular distances lengthwise along said axis a, only one form of tine 15, bracket portion 16, bolt 18 and bolt 20 being necessary to achieve this arrangement. Each tine 15 comprises an inner substantially straight portion 21 that is in tangential or substantially tangential relationship with an imaginary circle centered upon the axis a, its outer end merging, by way of a bend, into an outer end portion 22 that is orientated forwardly with respect to the intended direction of operative rotation B (FIGS. 2 and 3) of the shaft 5 around its axis a. As viewed in a direction parallel to the axis a (FIG. 3), an angle of substantially 110° is enclosed between the longitudinal axes of the inner and outer portions 21 and 22 of each tine 15. The inner portion 21 of each tine 15 is formed at regular intervals along its length with five holes 22A, said holes 22A being spaced apart from one another by half the distance between the two holes in each bracket rim 19 that are provided for co-operation with the bolts 20. Thus each tine 15 can be secured to the corresponding rim 19 in any chosen one of three different operative positions in which the outermost free end or tip of the portion 22 of the tine 15 concerned will be located at three different distances from the axis a. The accompanying drawings all show the tines 15 mounted in positions in which the circles that are traced by the tips of the outermost ends of their portions 22 during the operation of the implement will have their maximum possible diameter. When other positions of the tines 15 are chosen, the free ends of their portions 21 will project forwardly with respect to the direction B through short distances beyond the fastening rims 19 to which they are respectively secured. FIG. 3 of the drawings shows one bracket 16 in a position in which the fastening lugs of its two portions 17 are parallel to, and spaced above and below, a horizontal plane N-N which contains the axis a and, in this position of said bracket 16, the longitudinal axes of the inner portions 21 of the four tines 15 that are fastened to its rims 19 are inclined at angles of substantially 20° to said plane N-N.

As viewed in the direction of the axis a (FIG. 3), an angle of substantially 45° in subtended at that axis between the outer free ends of each pair of immediately neighbouring tine portions 22. Each bracket 16 is turned through 90° about the axis a as compared with the or each neighbouring bracket 16 in the same tine group 13 or 14 and said brackets 16 thus occupy alternate positions around the axis a considered lengthwise along the support 5. Each of the tines 15 is made from strip-shaped metal or other substantially rigid material and its outer end portion 22 is of tapering formation towards a point or tip at its leading (with respect to the direction B) extremity. The leading edge of each tine portion 22 with respect to the direction B is provided with a layer 23 of hard wear-resistant material and it will be seen from FIG. 3 of the drawings that said layers 23 extend along said leading edges from the outermost extremities thereof to substantially the beginnings of the curves by which the portions 22 are integrally connected to the portions 21.

A beam 24 of channel-shaped cross-section extends parallel to the frame beams 1 and 2 at a position substantially vertically beneath the frame beam 1, its opposite ends being releasably bolted, with the assistance of flanges (see FIGS. 3 and 4) to leading regions of the respective side plates 3 and 4. The lower leading extremity, with respect to the direction A, of a cylindrically curved screening hood or baffle 25 is welded or other wise rigidly secured to the free edges of the rearwardly directed limbs of the channel-shaped beam 24, the central axis of curvature of most of the hood or baffle 25 being coincident or substantially coincident with the axis a of the support 5. As can be seen in FIG. 3 of the drawings, the hood or baffle 25 subtends an angle of more than 90° at the axis a and it is greatly preferred that said angle should not be less than 90°. The upper rearmost edge of the hood or baffle 25 is bent over upwardly and is welded or otherwise rigidly secured to the outer surface of one limb of a channel-shaped beam 26, said beam 26 being fastened to securing plates 27 at its opposite ends. The beam 26 and the securing plates 27 are located, as seen in plan view (FIG. 1), just to the rear of the support 5 with respect to the direction A and it will be seen from FIGS. 2 and 3 of the drawings that the securing plates 27 project rearwardly behind the respective side plates 3 and 4 by short distances. A large number of spring steel rods 30 are fastened to the top and rear of the channel-shaped beam 26 by clamping plates 28 and bolts 29, the rods 30 being spaced apart from one another lengthwise along the beam 26 by regular distances that conveniently have magnitudes of substantially 3½ centimeters. It can be seen from FIG. 3 of the drawings that each rod 30 initially extends downwardly and rearwardly with respect to the direction A from the web or base of the beam 26 in substantially parallel relationship with the general plane of that web or base but that, at some distance from said beam 26, it is curved downwardly to terminate at a level just beneath that of the horizontal plane N-N, the downwardly curved portions of the rods 30 having centers of curvature which substantially coincide with the axis a. The large number of substantially identical rods 30 together form a grating.

Upwardly directed parts of the securing plates 27 that project rearwardly beyond the beam 26 with respect to the direction A carry horizontally aligned pivot pins 31 about which corresponding arms 32 are upwardly and downwardly turnable. The arms 32 are fixedly secured to corresponding side plates of a second screening hood or baffle 33 which partially surrounds the resilient rods 30 at a location above and to the rear of those rods with respect to the direction A. The lower rearmost edge of the curved part of the second screening hood or baffle 33 is located at substantially the same horizontal level as is the axis a. Four pairs of substantially planar sheet metal or other sheet material guide members 34 are provided on the lower concave curved surface of the second hood or baffle 33, the two guide members 34 of each pair being spaced apart from one another in a horizontal direction that is substantially perpendicular to the direction A. Three substantially vertical plates 35 are secured to the inner concave curved surface of the second hood or baffle 33 and upper edges of the guide members 34 are fastened to said plates 35 at the three locations at which one member 34 of one pair adjoins an opposed member 34 of the neighbouring pair. The leading edges of the guide members 34 with respect to the direction A are inclined downwardly and rearwardly from their upper ends with respect to the direction A and it will be seen from FIGS. 2 and 3 fo the drawings that said leading edges are located only very closely behind the initial upper straight portions of the rods 30.

The two outermost guide members 34 co-operate with the respective side plates 3 and 4 instead of with the substantially vertical plates 35, the lowermost edges of all of the rearwardly convergent pairs of guide members 34 being at substantially the same horizontal level as the lowermost edge of the major curved portion of the second hood or baffle 33. FIG. 1 of the drawings shows that the two end tine groups 13 are in register, in the direction A, with the two end guide members 34 that adjoin the side plates 3 and 4 whereas the three intermediate, and larger, tine groups 14 register, in the direction A, with the three substantially vertical plates 35 and their flanking guide members 34, it being remembered that the guide members 34 which immediately flank the plates 35 do not themselves co-operate but are single members of corresponding different pairs.

The four pairs of guide members 34 define, between them, four openings and, at the rear ends of said openings, with respect to the direction A, four corresponding flexible flaps 36 are mounted throughout the widths of said openings. The flexible flaps 36 are preferably mounted in their appointed positions by means of wing nuts and screwthreaded dowels and, as can be seen in FIG. 1, alternative holes are formed in them so that their free extent downwardly and rearwardly from the second hood or baffle 33 is adjustable, It will be noted from FIG. 1 of the drawings that the side edges of the flaps 36 are convergent to a small extent away from the hood or baffle 33 so that said flaps 36 may be said to taper towards their free rearmost edges.

The two frame beams 1 and 2 are interconnected, at two locations which are spaced inwardly by short distances from the ends of said frame beams, by supports 37 whose lower ends project forwardly beyond the beam 1 by some distance. The leading surfaces of the two supports 37 carry substantially horizontally forwardly projecting arms 38 whose foremost free ends carry corresponding substantially vertically disposed sleeves 39 that are of square cross-section. Upright supports 40 that are of matching square cross-section are slidable upwardly and downwardly inside the sleeves 39, the supports 40 being formed at regularly spaced apart intervals with transverse holes 42 and the walls of the sleeves 39 being formed at two locations which are spaced apart at different distances to the holes 42 with upper and lower pairs of holes 44. Horizontal locking pins 43 are provided for entry through chosen holes 42 and chosen registering holes 44 and the different hole spacing are such that a large range of different extents of projection of the supports 40 downwardly from beneath the bottoms of the sleeves 39 is available. The two supports 40 carry, close to their lowermost ends, substantially horizontal axle shafts upon which corresponding pneumatically tired ground wheels are mounted in a freely rotatable manner. The axle shafts project from the relatively remote sides of the two supports 40 so that as can be seen in FIG. 1 of the drawings, the outer surfaces of the two ground wheels 41 are substantially coplanar with the respective farme side plates 3 and 4 when, as is preferred, those side plates are substantially vertically disposed in substantially parallel relationship with one another and with the direction A.

The two frame beams 1 and 2 carry, substantially midway across the width of the machine, a coupling member or trestle 45 that is of substantially tiangular configuration as seen in either front or rear elevation. The coupling member or trestle 45 defines two lower coupling points and a single upper coupling point for connection to the three-point lifting device or hitch at the rear of an agricultural tractor or other operating vehicle. Two lugs 46 that are of L-shaped cross-section have two of their limbs welded or otherwise rigidly secured to the upper convex curved surface of the second screening hood or baffle 33, the other limbs of said lugs 46 being inclined upwardly. The short horizontally aligned opposite ends of a rod-shaped bracket 47 (which bracket 47 is principally of shallow V-shaped configuration as seen in plan view - FIG. 1) are turnably entered in horizontally aligned holes formed in the upright limbs of the two lugs 46. The "point" of the bracket 47 is connected to one end of a chain 48 which chain extends upwardly and forwardly over the support 5 and its tines 15 to a slotted bracket 49 that is mounted on one side plate of the coupling member or trestle 45. The chain 48 is effectively adjustable in length by engaging chosen links thereof in the slot in the bracket 49 in such a way (that is known per se) that the next link of the chain cannot pass through the slot and it will be appreciated that the particular link of the chain 48 that is chosen for co-operation with the slotted bracket 49 determines the maximum extent to which the second hood or baffle 33 can turn downwardly about the axis defined by the pivot pins 31 in a clockwise direction as seen in FIGS. 2 and 3 of the drawings but does not prevent the hood or baffle 33 from turning upwardly in a anticlockwise direction about said pivot pins 31 as seen in the same two Figures.

The stub shaft 10 that projects through the side wall 4 of the machine frame into the gear box 12 is provided, inside said gear box, with a toothed pinion 50 (FIG. 2), the teeth of said pinion 50 being in driven connection with those of a larger pinion 51 that is rotatably mounted on a horizontal stub shaft fastened to the side plate 4. The teeth of the pinion 51 are, in turn, in driven mesh with those of a third pinion 52 that is of the same size as the pinion 50. The pinion 52 is secured to the end of a substantially horizontal shaft 53 that is located inside the gear box 12, said shaft 53 extending, from that end, towards the center of the machine through a tubular casing 54 (FIG. 1) in which it is rotatably journalled. The end of the shaft 53 that is remote from the gear box 12 is disposed inside a gear box 55 that is sustained from the frame beam 2 by supports 56. Bevel pinions and shafts (not visible) within the gear box 55 and a change-speed gear 57 which is mounted at the back of that gear box with respect to the direction A place the output shaft 53 of the gear box in driven connection with a rotary input shaft 58 thereof which shaft 58 projects substantially horizontally forwards from the front of the gear box 55 in parallel or substantially parallel relationship with the direction A. The forwardly projecting end of the shaft 58 is splined or otherwise keyed to enable it to be placed in driven connection with the rear power take-off shaft of an agricultural tractor or other operating vehicle through the intermediary of a telescopic transmission shaft 59, which is of a construction that is known per se, having universal joints at its opposite ends. It is not necessary to describe the construction of the change-speed gear 57 in detail, nor to illustrate it in the drawings, for the purposes of the present invention but, briefly, the rearmost end of the shaft 58 and the rearmost end of a parallel shaft that is not visible in the drawings project into the change speed gear 57 where they are splined or otherwise keyed for the reception of the hubs of a chosen pair of straight-toothed or spur-toothed pinions, said chosen pinions being selected from two or more pairs thereof that are of different sizes. The particular pair of pinions (not visible) that is chosen and its arrangement relative to said splined or otherwise keyed shaft ends determines the transmission ratio between the rotary input shaft 58 of the gear box and its output shaft 53 and thus the speed at which the support 5 will be rotated in the direction B in response to a substantially constant input speed of rotation applied to the forwardly projecting leading end of the shaft 58.

The lower leading edge, with respect to the direction A, of the foremost hood or baffle 25 is provided at its opposite ends, and thus alongside the respective side plates 3 and 4, with corresponding screening plates 61 which are releasably secured in their appointed positions by bolts 60 (FIG. 4). Each plate 61 has a longer upper edge and a shorter parallel lower edge, a perpendicular edge which abuts against the adjoining side plate 3 or 4 and an inclined fourth inner edge which interconnects the ends of the upper and lower substantially horizontally parallel edges that are remote from the side plate 3 and 4 concerned. The screening plates 61 are substantially in register with the two tine groups 13 in the direction A and co-operate with the tines 15 of those two groups in preventing them from displacing soil too far laterally since that would tend to give rise to accumulations of earth between some of the ridges which are formed by the implement during successive traverses thereof across a field.

The soil cultivating machine that has so far been described with reference to FIGS. 1 to 6 of the accompanying drawings has an effective working width of substantially 3 meters and is particularly useful in earthing up patatoes and other sub-surface crops that are planted in rows under ridge culture. The coupling member or trestle 45 of the machine is connected to the three-point lifting device or hitch of an agricultural tractor or other operating vehicle in the manner that has been discussed above and that is illustrated in outline in the drawings and the rotary input shaft 58 of the gear box 55 is placed in driven connection with the rear power takeoff shaft of the same tractor or other vehicle by way of the known telescopic transmission shaft 59 which has universal joints at its opposite ends. Adjustments that may be required before work commences include setting the working depth of the tines 15 by displacing the ground wheels 41 bodily upwardly or downwardly relative to the frame of the machine, using the locking pins 43 to maintain a chosen position of adjustment. The length of the chain 48 is adjusted so that the second screening hood or baffle 33 will match the chosen working depth of the tines 15, and the speed of rotation of those tines about the axis a, in response to a substantially constant input speed of rotation applied to the shaft 58, is chosen by making a suitable adjustment to the change-speed gear 57. Adjustments of the tines 15 relative to the fastening rims 19 may also be made as will be discussed below. As the machine moves operatively over a field of potatoes or the like planted in rows, the support 5 and the tine groups 13 and 14 all revolve in the direction B (FIGS. 2 and 3) which direction is such that said tines 15 move forwardly through the soil with respect to the direction A. The tine groups register with the gaps between the rows of potatoes or the like and thus work the soil in those gaps while the spaces between the tine groups (see FIGS. 1 and 5) register with the rows of potatoes or the like themselves so that the soil in said rows is not worked by the tines 15. The tines 15 that are rotating around the axis a carry displaced soil forwardly and upwardly in the direction B, the quantity of soil that is displaced being dependent to a considerable extent upon the working depth that has been preset by adjustment of the ground wheel supports 40 relative to the sleeves 39. The displaced soil is moved by the tines 15 in the direction B beneath the leading hood or baffle 25 and is then thrown rearwardly against the grating that is formed by the rods 30. Stones, hard lups of soil, roots, crop debris and so on that are too large to pass through the gaps between the rods 30 slide downwardly along those rods and fall to the bottom of the furrows that have been formed by the respective tine groups 13 and 14. Finely divided soil that can pass readily between the rods 30 is thrown rearwardly into engagement with the second hood or baffle 33 and its guide members 34, said soil being guided downardly toward the ground surface to form ridges that register with the rows of potatoes or the like that lie between the successive tine groups 13 and 14. The tops of the formed ridges are flattened and slightly consolidated by the lower surfaces of the flexible flaps 36 and this is desirable from the point of view of moisture retention and resistance to the action of strong winds.

The described and illustrated way of mounting the tines 15 in their appointed positions enables those tines to engage the soil in a very effective manner, it being remembered that the tines 15 in the successive groups 13 and 14 are spaced apart from one another lengthwise of the axis a of the support 5. The described and illustrated formation of the tines 15 is such as substantially to avoid any smearing of the soil, which is particularly likely to occur in heavy soils, such smearing being inclined to impede sprouting and emergence of potatoe plants when it has resulted in the formation of hard lums in the overlying ridges. The shape of the tines 15 combines with their operative direction of rotation B in ensuring that very finely divided soil is not displaced upwardly in the direction B with the tines 15 but is merely displaced forwardly and laterally thereby. This finely divided soil commences to form the required ridges before any further less finely divided soil is supplied from the guide members 34, the latter soil substantially completing the ridges and bringing them to their required final heights as dictated by the effective length of the chain 48 that is chosen by engaging an appropriate link thereof with the slotted bracket 49. Since the basically strip-shaped tines 15 make edgewise contact with the soil as they revolve around the axis a in the direction B, by no means all of the engaged soil is thrown upwardly and rearwardly over the top of the support 5 towards the resilient rods 30 so that less power than might at first appear to be necessary is actually required to rotate the support 5 and the tine groups 13 and 14.

The tines 15 in the respective groups 13 and 14 may, if considered necessary, be arranged in different positions relative to the respective bipartite brackets 16. For example, those tines 15 which will work substantially midway between two rows of potatoes or the like may be placed in their maximum working diameter positions (as shown in FIG. 3) whereas the end tines 15 of the group under consideration that will be in register, in the direction A, with the margins of respective ridges, may be placed in their minimum working diameter positions by causing the bolts 20 to co-operate with appropriate holes 22A. Intermediate tines 15 in the group may be disposed in the third intermediate position thereof that is possible in which the outermost free ends or tips of the portions 22 of said tines are between the outermost and innermost spacings from the axis a which they are capable of occupying. With this arrangement the tines 15 that are disposed at the outer ends of the groups principally displace soil only forwardly and laterally with respect to the direction A so that they initiate the formation of the required ridges without displacing any appreciable quantities of soil rearwardly towards the rods 30. Potatoes or the like planted in rows and the soil effectively earthed up into ridges by a single pass of the machine that has been described, said implement operating economically as regards its power consumption. The grating that is afforded by the spaced resilient rods 30 prevents large stones, roots, crop debris, hard lumps of soil and the like from being introduced into the upper regions of the ridges so that no interruption to growth is caused thereby. The flexible flaps 36 smooth and consolidate the tops of the formed ridges and give them some resistance to adverse weather conditions. If desired, the soil cultivating machine that has been described may be arranged to cultivate the soil substantially throughout its effective working width by loosening at least some of the bolts 18 and repositioning the brackets 16, that each carry two opposed pairs of tines 15, at substantially regular intervals along the axis a of the support 5. The machine will then operate to bury stones, roots and the like throughout its working width and will produce a bed of quite finely divided soil in which potatoes or other crops can advantageously be planted. The second hood or baffle 33 may, if desired, be retained in an upwardly tilted inoperative position during working of this kind.

The same machine can be used during the harvesting of potatoes and the like as is illustrated in FIGS. 7 and 8 of the drawings. Bracket portions 65 that are somewhat similar to the previously described bracket portions 17 are clamped around the support 5, at locations midway between the tine groups, by bolts 66 that are similar, or identical, to the bolts 18. Each bracket portion 65 has a corresponding broad fork 64 welded or otherwise rigidly secured to it, the limbs of the fork 64 being interconnected by a pivot 63 which defines an axis that is parallel or substantially parallel to the axis a. Each pivot 63 has a corresponding striker 62 turnably mounted thereon between the limbs of the corresponding bracket 64 and, when the machine is in operation with the opposed pairs of strikers 62 fitted, said strikers 62 knock off the haulms, or at least the leaves, of the potato plants or the like that are growing upwardly through soil ridges. The excised haulms and leaves are moved rearwardly by the tines 15 of the groups 13 and 14, the guide members 34 subsequently engaging them and depositing them loosely on the ridges in substantially the form of swaths. The rods 30 are preferably temporarily removed when the machine is used in this way to avoid any action thereby upon the excised haulms and leaves. The adaption of the machine for use in potato harvesting work ensures that it can be employed at different times of the year in a more economic way than would otherwise be possible.

Although various features of the soil cultivating machine that has been described and that is illustrated in the accompanying drawings will be set forth in the following claims as inventive features, it is emphasised that the invention is not necesarily limited to those features and that it includes within its scope each of the parts of the soil cultivating machine that has been described, and/or that is illustrated in the accompanying drawings, both individually and in various combinations.

What we claim is:

1. A soil cultivating machine comprising a frame and soil working members being rotatably mounted on said frame, said members being positioned in a row that extends transverse to the direction of travel, driving means connected to rotate said members and displace part of the engaged soil to the rear, said members comprising groups of tines that have inner portions releasably fastened to an elongated horizontal support having a polygonal cross-section, outer portions of said tines being angled to corresponding inner portions, said driving means being connected to rotate said support and move said tines through the soil forwardly with respect to the normal direction of machine travel, hood means on said machine positioned to the rear of said support and spaced apart guide members being secured to the innerside of the hood means to receive part of the soil displaced by said tines and guide the same into ridges, at least one group of tines comprising units of opposed pairs of tines being mounted on said support in spaced apart relationship, immediately neighboring tine-units being offset around the longitudinal axis of said support by an angle about equal to that which a side of said support subtends, whereby some of the engaged soil is displaced forwardly and laterally, said hood means comprising a front hood that partly surrounds said members and has a curved plate portion, the leading edge of said plate portion being below the level of the axis of rotation of said support, said front hood comprising screening plates located at opposite front ends thereof and said screening plates having obliquely upwardly and inwardly inclined inner edges.

2. A machine as claimed in claim 1, wherein said tines are substantially hook-shaped and each tine has an inner portion that is in substantially tangential relationship with an imaginary circle centered on the longitudinal axis of said support, said inner portion terminating in a relatively inclined outer portion that is orientated forwardly from said inner portion with respect to normal direction of rotation of said support.

3. A machine as claimed in claim 2, wherein said inner portion extends rearwardly away from a fastening location thereof with respect to the direction of support rotation and in the corresponding tine's lowermost position.

4. A machine as claimed in claim 1, wherein said support is hollow and has a square cross-section, said pairs of tines being fastened on bracket portions that are clamped around the sides of the support.

5. A machine as claimed in claim 4, wherein the ends of said bracket portions have fastening lugs in substantial register around said support and opposing portions comprising complete brackets, each complete bracket having two substantially symmetrical bracket portions and each portion having two sides with respective fastening rims, a tine being secured to each rim.

6. A machine as claimed in claim 5, wherein the portions of adjacent brackets are fastened to said support, one portion of one bracket being offset relative to another portion, lengthwise of the longitudinal axis of said support.

7. A machine as claimed in claim 5, wherein the tines of each unit have inner portions positioned at opposite sides of the rims of the respective bracket portions.

8. A machine as claimed in claim 7, wherein said inner portion has a plurality of holes that cooperate with releaseable fastenings and further holes in a corresponding one of said rims, said tines being releasably secured in any chosen one of three different positions relative to said rim.

9. A machine as claimed in claim 1, wherein said hood means comprises a rear hood and flexible flaps are carried by the rear hood, said flaps being located in spaces between soil delivery ends of said guide members.

10. A machine as claimed in claim 9, wherein each flap tapers towards a lower free end thereof remote from the rear hood.

11. A machine as claimed in claim 9, wherein a grating is positioned between said tines and said guide members, said grating being a plurality of relatively spaced rods arranged side-by-side, the longitudinal center line of each rod being contained in a plane that is substantially perpendicular to the longitudinal axis of said support.

12. A machine as claimed in claim 1, wherein the guide members are arranged in pairs and each guide member is planar in configuration.

13. A machine as claimed in claim 1, wherein said tines are strip-shaped and the outer portions thereof terminate in points at their outer ends.

14. A soil cultivating machine comprising a frame and soil working members being rotatably mounted on said frame, said members being positioned in a row that extends transverse to the direction of machine travel, driving means connected to rotate said members and displace soil to the rear, said members comprising groups of tines that have inner portions releasably fastened to an elongated horizontal support, outer portions of said tines being angled to corresponding inner portions, said driving means being connected to rotate said support and move said tines through the soil forwardly with respect to the normal direction of travel, hood means on said machine positioned to the rear of said support, and spaced apart guide members being secured to the innerside of the hood means to receive part of the soil displaced by said tines and guide the same into ridges, a front hood partly surrounding said members and comprising a curved plate portion having a leading edge located below the level of the axis of support rotation, said front hood comprising screening means positioned at opposite lateral ends thereof and said screening means having obliquely upwardly and inwardly inclined inner edges.

* * * * *